(12) United States Patent  (10) Patent No.: US 7,000,719 B2
Ceccarani et al. (45) Date of Patent: Feb. 21, 2006

(54) AIR INTAKE FOR MOTOR VEHICLES (75) Inventors: Massimo Ceccarani, Bologna (IT); Corrado Rebottini, Crevalcore (IT); Stefano Mazzetti, Casalecchio di Reno (IT); Andrea Bonfatti, Finale Emilia (IT)

(73) Assignee: Automobili Lamborghini S.p.A., Agata Bolognese (IT)

( * ) Notice: Subject to any disclaimer, the term of this patent is extended or adjusted under 35 U.S.C. 154(b) by 2 days.

(21) Appl. No.: 10/486,997

(22) PCT Filed: Aug. 30, 2001

(86) PCT No.: PCT/IT01/00452

§ 371 (c)(1), (2), (4) Date: Jul. 2, 2004

(87) PCT Pub. No.: WO03/019544

PCT Pub. Date: Mar. 6, 2003

(65) Prior Publication Data

US 2004/0238246 A1 Dec. 2, 2004

(51) Int. Cl.
B60K 11/00 (2006.01)

(52) U.S. Cl. .................................. 180/68.1

(58) Field of Classification Search ............... 180/68.1, 180/68.2, 68.3; 454/136, 137, 138, 151, 454/164; 296/212, 216.02, 217, 221, 223
See application file for complete search history.

(56) References Cited

U.S. PATENT DOCUMENTS

| 2,194,396 A | * | 3/1940 | Klavik ...................... 180/68.1 |
| 4,690,204 A | | 9/1987 | Reichel et al. |
| 4,889,382 A | | 12/1989 | Burst et al. |

FOREIGN PATENT DOCUMENTS

WO  WO 01/46570 A1  6/2001

* cited by examiner

Primary Examiner—J. Allen Shriver
Assistant Examiner—John D. Walters
(74) Attorney, Agent, or Firm—Lucas & Mercanti, LLP (57) ABSTRACT Air intake comprising at least one deflector (1) which is provided with one or more walls (5, 6, 9) suitable for conveying air through an opening (4) made in the body of a motor vehicle (2), and which is hinged to at least one member (7) of the motor vehicle (2) for being rotated by at least one motor (19) around an axis (3), so as to modify the size of said opening (4). The angle comprised between the rotation axis (3) of the deflector (1) and the vertical symmetry plane of the motor vehicle (2) is preferably not greater than 45°, in particular less than 5°.

19 Claims, 7 Drawing Sheets

AIR INTAKE FOR MOTOR VEHICLES

This patent application claims the benefit of priority from PCT application Ser. No. PCT/IT01/00452 filed Aug. 30, 2001, the contents of which is incorporated herein by reference.

The present invention relates to an air intake for motor vehicles, and in particular an air intake with a variable geometry which can be employed for cooling the engines of the sports-cars.

Air intakes for motor vehicles, known e.g. from WO 01/46570, comprise at least one deflector which is provided with one or more walls suitable for conveying air through one opening which is made in their body and is turned towards their front portion. On one hand these air intakes worsen the aerodynamics of the motor vehicle, on the other hand these must have a big size when the engine is very powerful, such as in the sports-cars, in which however the best aerodynamics is really important. As a matter of fact, if the air intake should not have a suitable size, the engine might dangerously overheat.

It is therefore an object of the present invention to provide an air intake free from said disadvantages. Said object is achieved with an air intake, the main features of which are disclosed in the first claim and other features are disclosed in the following claims.

Thanks to the movement system of the deflector, the air intake according to the present invention can vary its geometry and then adapt the airflow going to one or more radiators according to the cooling necessities. With this arrangement it is therefore possible to make smaller the size of the opening of the air intake when the incoming air is sufficient for the engine cooling, so as to optimize the motor Vehicle aerodynamics. This is important at high speeds, where the aerodynamics of the motor vehicle heavily affect the performances of the latter.

For further improving the aerodynamics of the motor vehicle, it has been found that the angle comprised between the rotation axis of the deflector and the vertical symmetry plane of the motor vehicle must preferably be not greater than 45°, better if less than 5°. With this arrangement also the aerodynamic loads acting onto the deflector and opposing its motion are decreased, with a consequent reduction of the failure risk of the motor which drives it.

Furthermore, by suitably shaping the deflector walls and the body portion under it, as well as by arranging the hinges toward the central axis of the motor vehicle, the aerodynamics of the air intake according to the present invention is further improved, in the closed and open positions.

According to a particular aspect of the invention, the position of the deflector of the air intake can not only depend upon the speed of the motor vehicle, but also upon the speed of its engine, as well as upon the temperature of the cooling liquid and/or of the external air, so that the deflector is open only when it is strictly needed.

According to another advantageous aspect of the invention, the air intake is controlled by a device which can not only precisely move the deflector, but also verify its correct displacement and working. For this purpose, the electronic control device is preferably provided with encoders, a PWM device and electronic calculation means, for instance a microprocessor. Furthermore, the control device allows to determine obstacles, if any, to the deflector motion and immediately signal them to the motor vehicle user.

According to a further advantageous aspect of the invention, the deflector movement can be manually controlled by the user, for instance for working tests or other purposes.

Further advantages and features of the air intake according to the present invention will be clear to those skilled in the art from the following detailed and non-limiting description of an embodiment thereof, with reference to the attached drawings, wherein.

Referring to FIGS. 1 to 6, it is seen that the air intake according to the present embodiment of the invention comprises a deflector 1 which is hinged to a member of a motor vehicle 2. The mobile deflector 1 can therefore rotate around an axis 3, so as to modify the size of an opening 4 which is made in the body of motor vehicle 2 and is turned towards its front portion.

In particular, the angle comprised between the rotation axis 3 of deflector 1 and the vertical symmetry plane of motor vehicle 2 is not greater than 45° and is preferably less than 5°, i.e. the rotation axis 3 is substantially parallel to the motion direction of motor vehicle 2. For conveying the air inside motor vehicle 2 through opening 4, deflector 1 comprises a side wall 5 and a rear wall 6. For improving the aerodynamics, the side wall 5 is preferably convex and has a substantially rectangular shape, while the rear wall is preferably concave and has a substantially half-conical shape, with the base turned towards the outside of motor vehicle 2.

Figure 1:
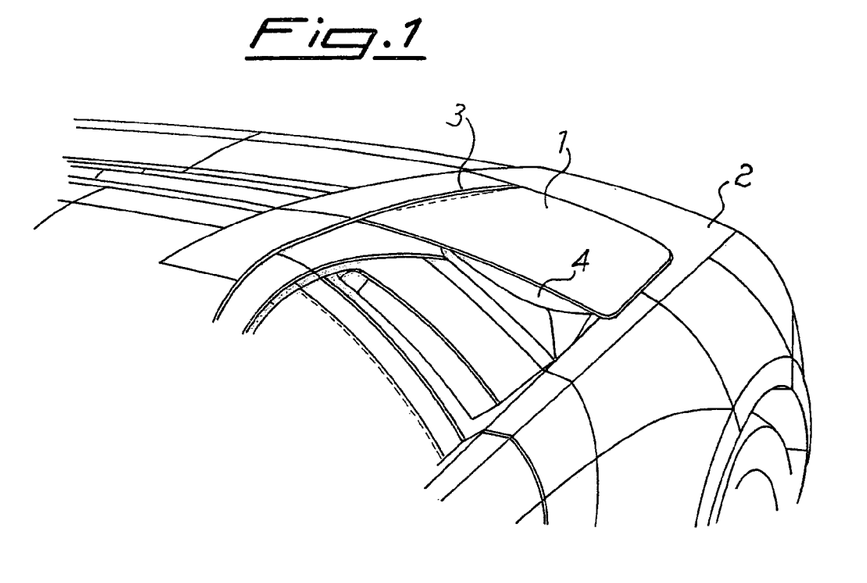
FIG. 1 shows a partial perspective front view of a motor vehicle with the closed air intake.
Figure 2:
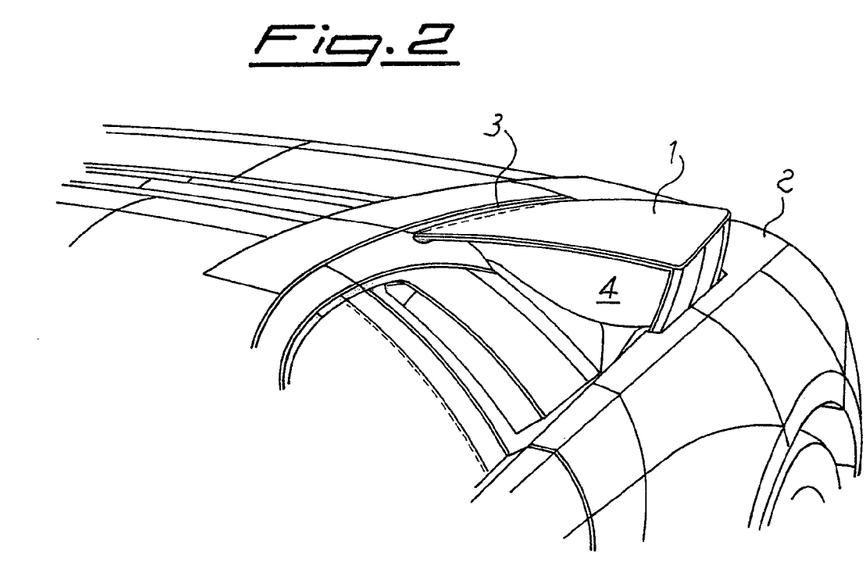
FIG. 2 shows a partial perspective front view of the motor vehicle of FIG. 1 with the open air intake.
Figure 3:
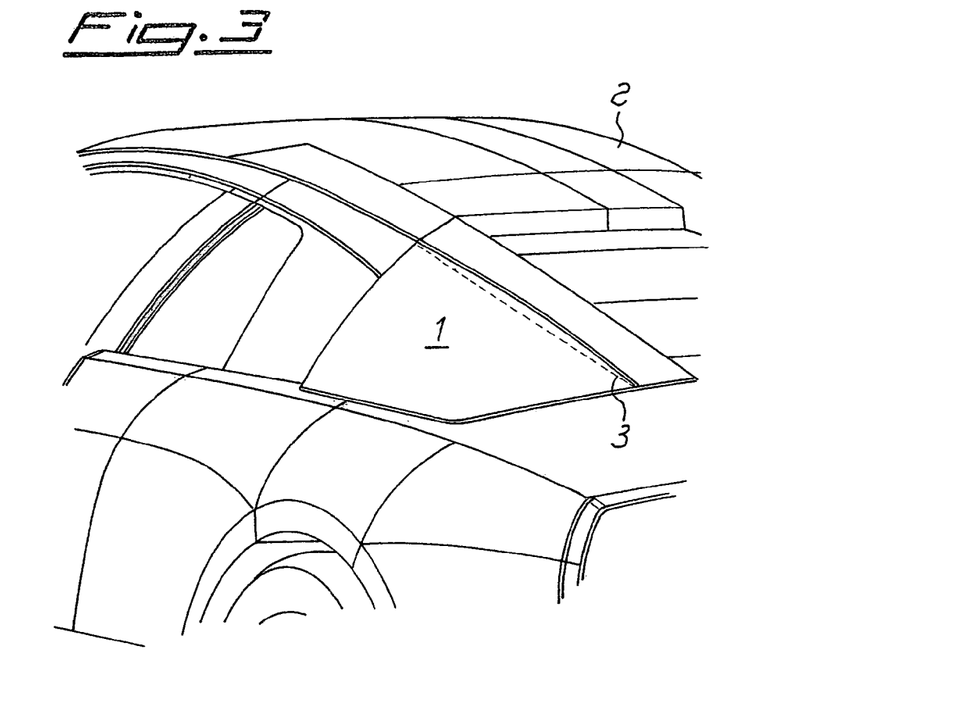
FIG. 3 shows a partial perspective rear view of the motor vehicle of FIG. 1 with the closed air intake.
Figure 4:
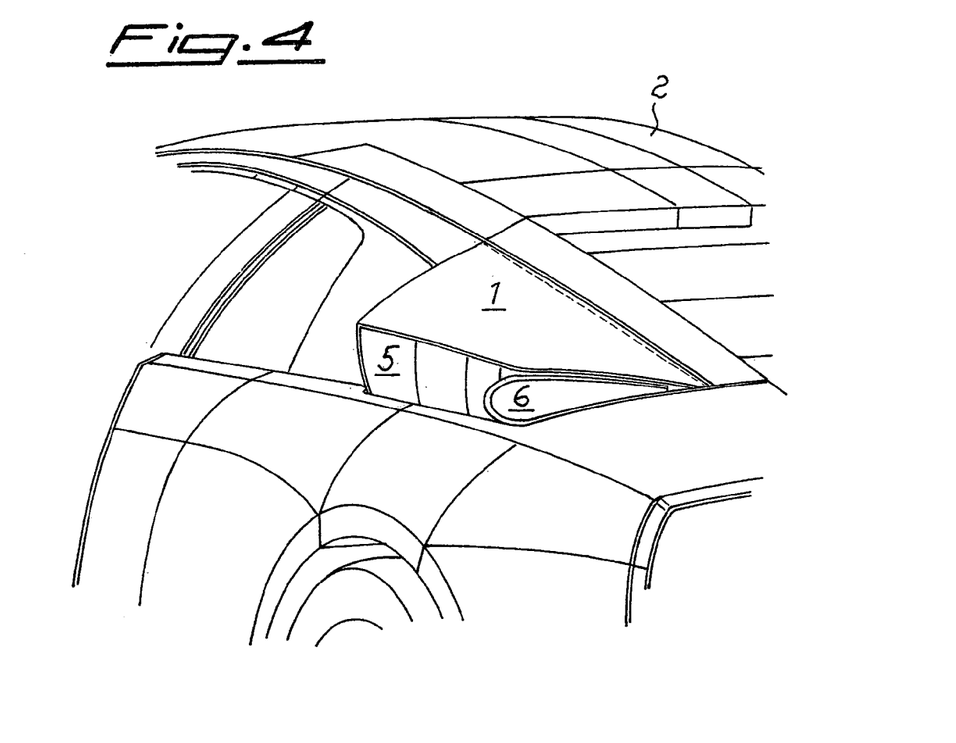
FIG. 4 shows a partial perspective rear view of the motor vehicle of FIG. 1 with the open air intake.
Figure 5:
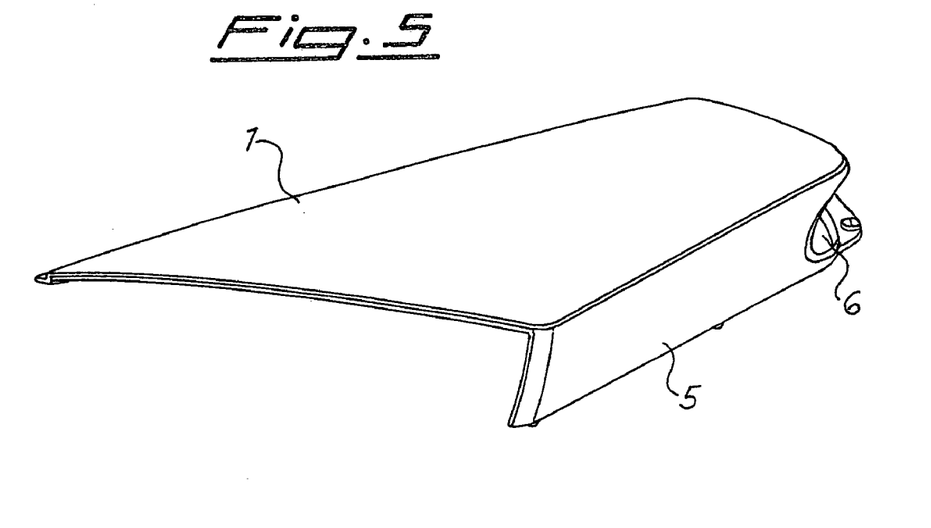
FIG. 5 shows a perspective front view of the deflector of the air intake of FIG. 1.
Figure 6:
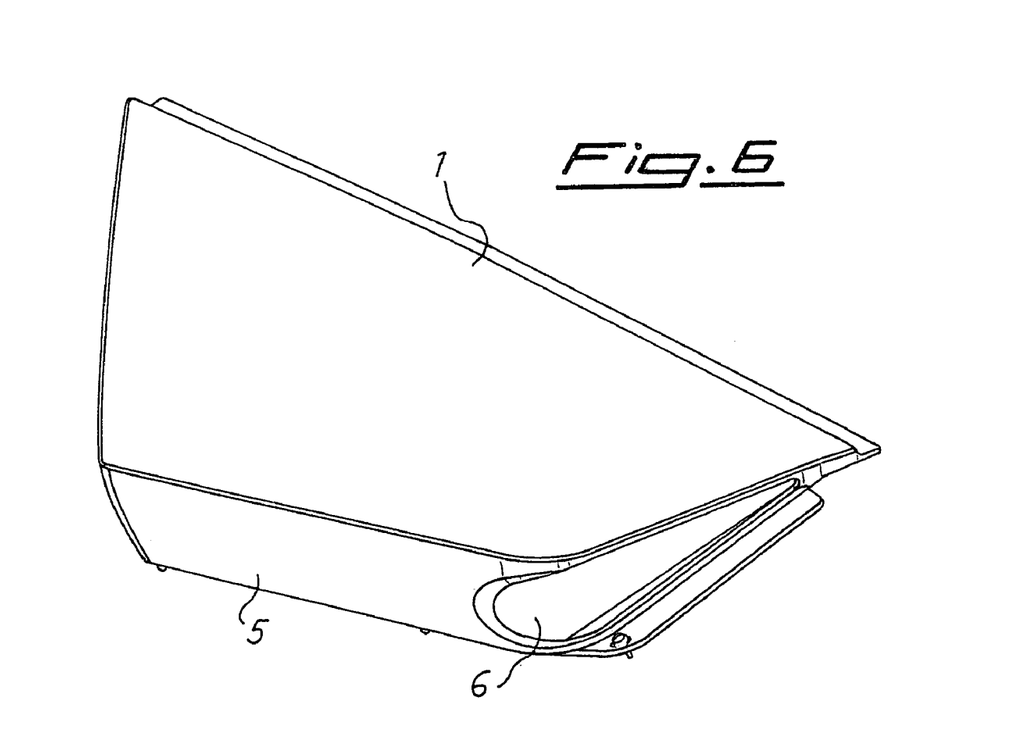
FIG. 6 shows a perspective rear view of the deflector of the air intake of FIG. 1.
Figure 7:
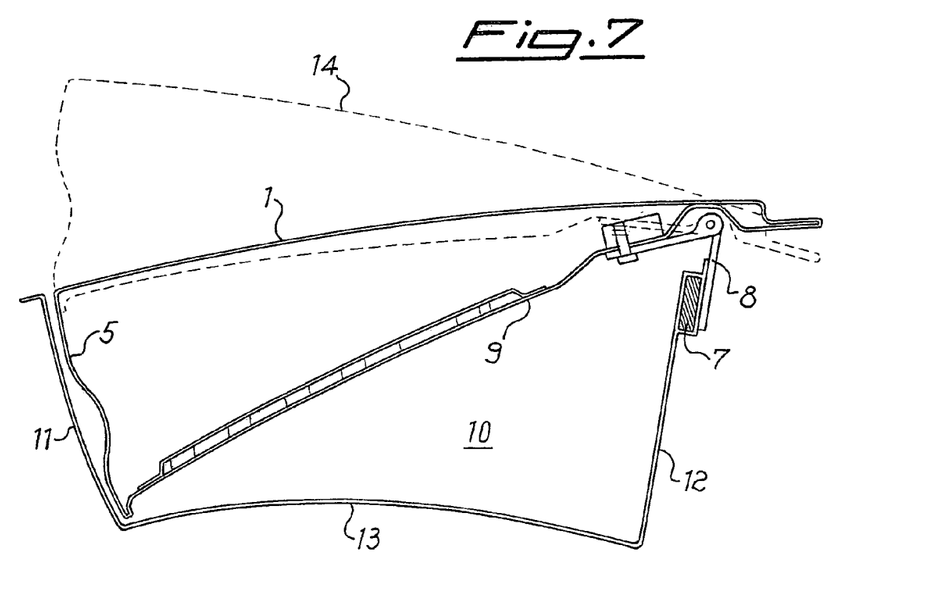
FIG. 7 shows a cross-section view of the rear portion of the air intake of FIG. 1.
Figure 8:
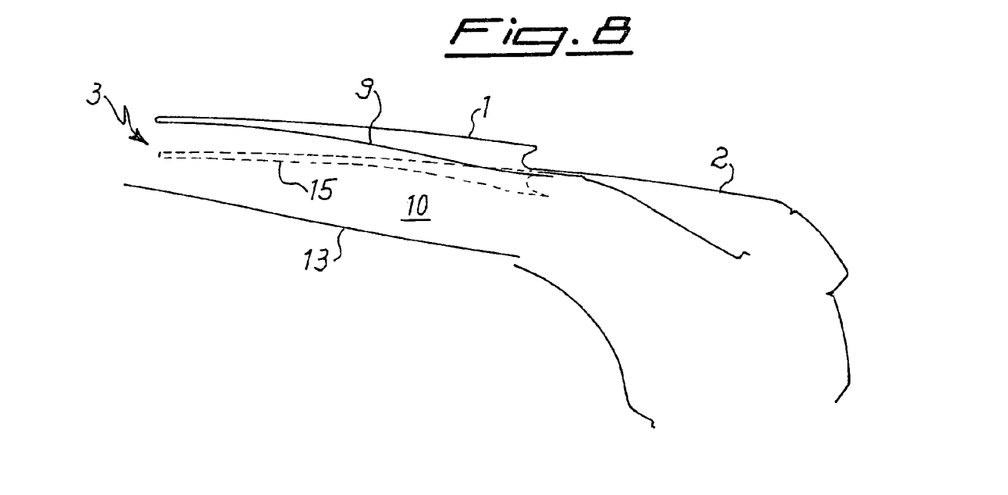
FIG. 8 shows a schematic longitudinal cross-section of the air intake of FIG. 1.

With reference to FIGS. 7 and 8, it is seen that deflector 1 is hinged to a portion 7 of the frame of motor vehicle 2 by means of one or more hinges 8 turned towards the central axis of the same motor vehicle, so that the side wall 5 is turned outwards. Deflector 1 further comprises an inner wall 9 inclined and shaped for conveying downwards the air coming from opening 4. For this purpose, the body of motor vehicle 2 is shaped so as to obtain a canal 10, defined by an outer side wall 11, an inner side wall 12 and a lower wall 13, which conveys the air coming from opening 4 towards the radiators of motor vehicle 2 (not shown in the figures). In case of motor vehicles with central or rear engine, a pair of air intakes according to the present invention are preferably arranged above the mudguard of each rear wheel with deflector 1 aligned with the body of motor vehicle 2 in the closed position and canal 10 made in the same body under deflector 1. In FIG. 7 deflector 1 is shown with a broken line 14 in the open position, while in FIG. 8 deflector 1 is shown with a broken line 15 in the closed position.

Figure 9:
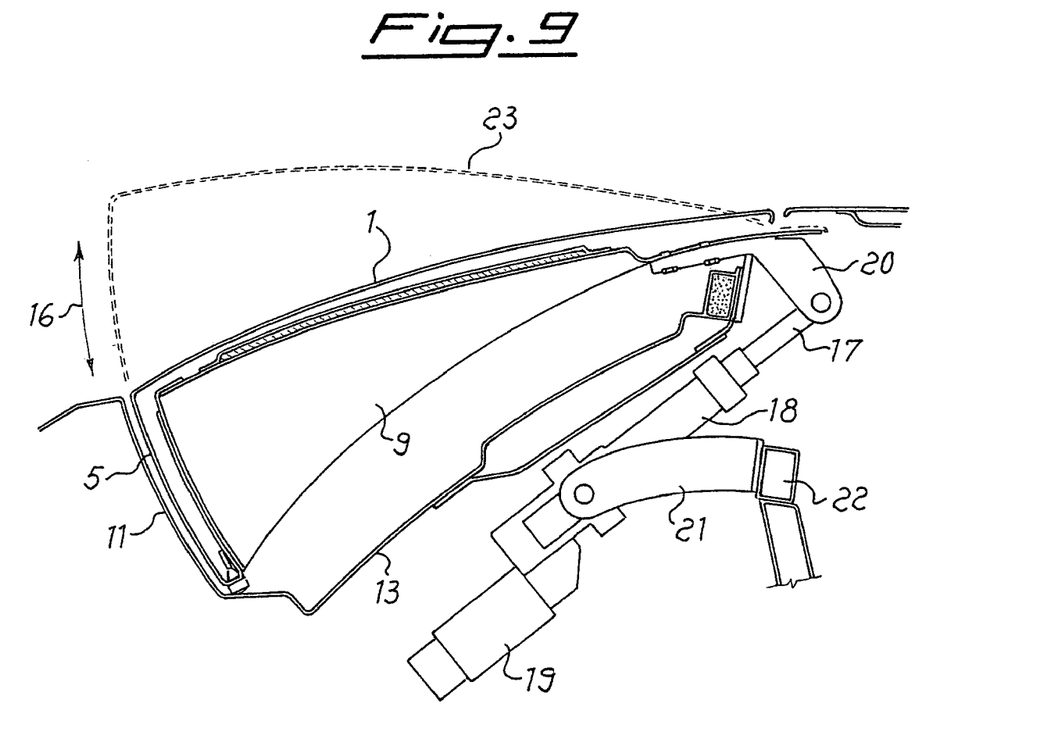
FIG. 9 shows a cross-section view of the central portion of the air intake of FIG. 1.

Referring now to FIG. 9, it is seen that deflector 1 can be rotated in the direction of arrows 16 by a piston 17 which can travel into a cylinder 18 and is driven by an electric motor 19, for instance a motor model Microwin 1:50 Lent. of the firm OSLV Italia. The free end of piston 17 is pivoted to a lever 20 fixed to deflector 1, while cylinder 18 is pivoted to a bracket 21 fixed to a member 22 of motor vehicle 2, for instance a portion of its frame. In the figure deflector 1 is shown with a broken line 23 in the open position.

Figure 10:
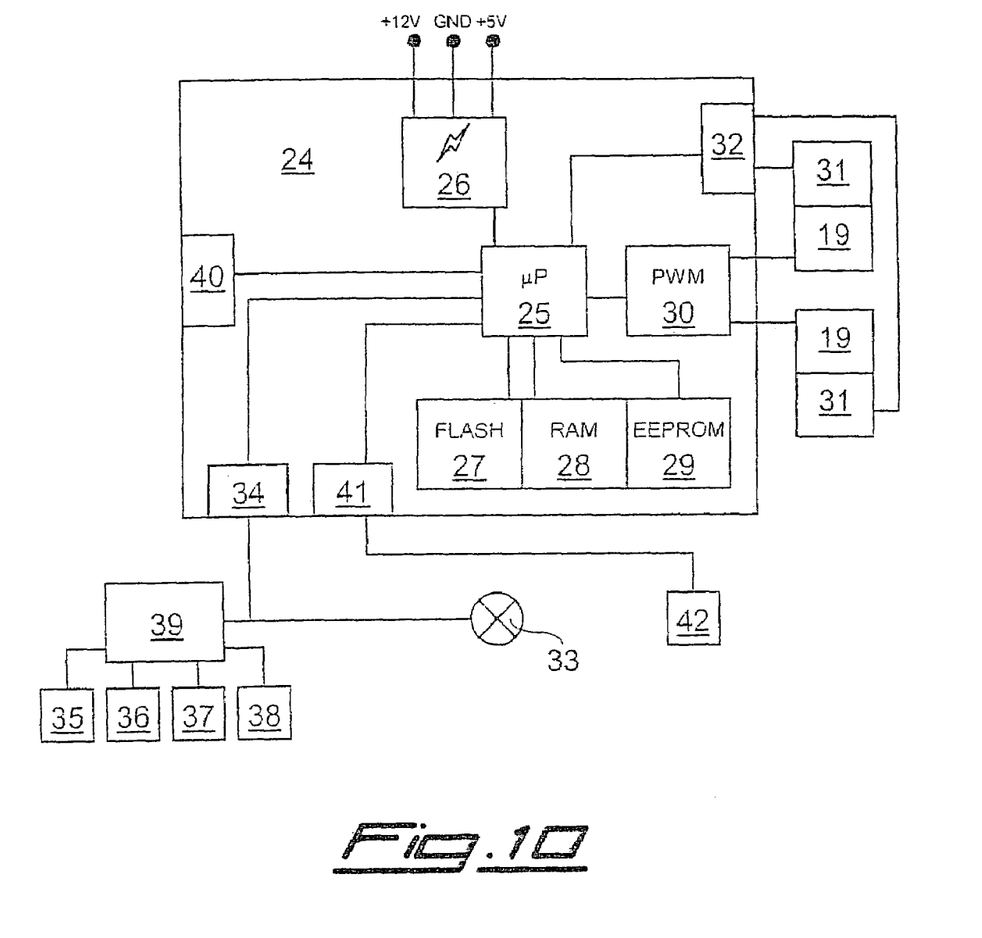
FIG. 10 shows an electric scheme of the control device of the air intake of FIG. 1.

With reference to FIG. 10, it is seen that the air intake according to the present invention comprises an electronic device 24 suitable for controlling one or more motors 19 for moving one or more deflectors 1. The control device 24 comprises in particular electronic calculation means 25, for instance a 8-bit Motorola MC68HC908AZ60 microprocessor with a variable inner clock set at 16 MHz, powered by a 400 mA power source 26 which is protected from overloads and is connected to the power lines of motor vehicle 2.

Microprocessor 25 is connected to one or more memories, in particular to a 60 kB Flash memory 27, to a 2 kB RAM memory 28 and to a 1 kB EEPROM memory 29, which contain data and programs for microprocessor 25, as well as to a PWM Pulse Width Modulation) device 30 for controlling motors 19. In particular, the PWM device 30 is connected to motors 19 and converts the control signals output by microprocessor 25 into signals with a constant voltage and variable duty cycle. The speed of motors 19 can thus be changed by intervening onto the electric power with which these are powered. The duty cycles of said signals are indeed calculated by microprocessor 25 according to the speed of motor vehicle 2 and to the position of deflector 1. This position is in turn suitably detected by encoders 31 which are applied to each motor 19 and are connected to microprocessor 25 through an interface 32. Encoders 31 are for instance known Hall-effect encoders generally comprised into the same motors 19 and measure the displacement of a deflector 1 or of a member connected thereto, as piston 17, with respect to a end-travel position, corresponding in particular to the closed air intake, i.e. to zero steps of encoder 31.

The electric power supplied by the PWM device 30 is the product of the intensity of the current circulating in motor 19 (proportional to the torque supplied by the motor itself) by the feeding voltage, from which the maximum speed reachable by motor 19 depends. By measuring the current circulating into motors 19 it is therefore possible to obtain the torque generated by them and then the force acting onto deflectors 1.

Through a series of threshold values stored into one or more of memories 27, 28 and 29 and which depend upon the kind of movement required and upon the PWM signal transmitted by device 30, microprocessor 25 verifies that the current supplied to motors 19 is compatible with a correct working of deflectors 1. If the current is excessively low, microprocessor 25 diagnoses an anomalous working, for instance a motor 19 in open circuit or its mechanical transmission idle. If instead the current exceeds the preset threshold values, i.e. the force exerted onto a deflector 1 becomes excessive, microprocessor 25 verifies the position of the deflector itself through one encoder 31. If the distance from the required position is less than a predefined threshold value, microprocessor 25 detects that deflector 1 has reached an end-travel position and stops it. If instead the distance from the required position is greater, then microprocessor 25 recognizes the presence of an obstacle.

This condition is potentially dangerous since the obstacle might be represented by limbs of a person, so that microprocessor 25 immediately inverts the direction of the movement imposed to deflector 1 up to the start position, so as to allow to remove the obstacle, after which it tries to bring deflector 1 in the required position. If the obstacle is not removed, the inversion cycle of the movement and the subsequent restoration attempt of the required position are repeated for a predefined number of times, after which microprocessor 25 stops deflector 1, thereby warning the user of an anomalous working through signaling means, for instance a pilot lamp 33 arranged on the dashboard of motor vehicle 2 and connected to microprocessor 25 through a data interface 34. Obviously, microprocessor 25 recognizes the completed movement also each time the number of steps of motor 19 detected by encoder 31 is equal to a predefined number of steps.

Through an interface 34, for instance of the CAN (Controlled Area Network) kind, microprocessor 25 is further connected to a plurality of external sensors, also of the known kind, i.e. a sensor 35 suitable for measuring the speed of motor vehicle 2, a sensor 36 suitable for measuring the rotation speed of the engine of motor vehicle 2, a sensor 37 suitable for measuring the temperature of the engine cooling liquid of motor vehicle 2 and a sensor 38 suitable for measuring the temperature of the external air. These sensors are generally already arranged in a sports-car and are connected to an electronic control unit 39 which controls the working of the car itself and can then be connected to interface 34. Microprocessor 25 is further connected to a serial interface 40 for transmitting and receiving data from the outside, as well as to a digital interface 41 in turn connected to a push-button 42 arranged inside the cabin of motor vehicle 2 for manually controlling the motion of deflectors 1.

Figure 11:
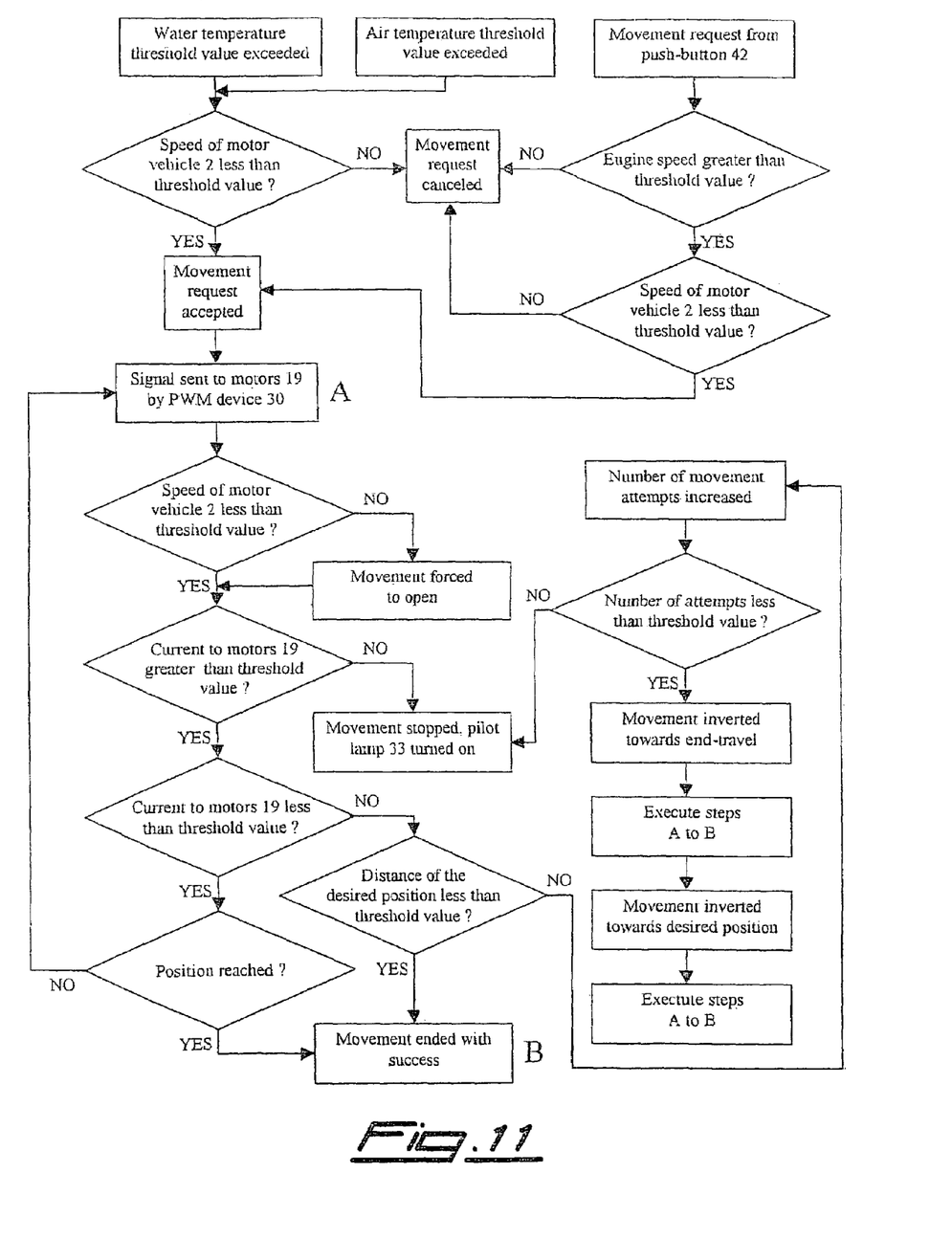
FIG. 11 shows a flow-chart of the working of the air intake of FIG. 1.

Referring now to FIG. 11, it is seen that the request for opening or closing deflectors 1 can be sent manually by the user through push-button 42, or automatically by microprocessor 25 when predefined threshold values stored into one or more of memories 27, 28 and 29 and relating to the air temperature measured by sensor 38 or to the cooling liquid temperature measured by sensor 37. The threshold values of the temperatures at which the closing is ordered are preferably lower than those at which the opening is ordered, so as to avoid unpleasant wobbles of deflectors 1.

In order that the request of carrying out a movement is effectively converted into an order for motors 19, the engine rotation speed of motor vehicle 2 detected by sensor 36 must be greater than a threshold value, for instance greater than zero, while the speed of motor vehicle 2 detected by sensor 35 must be lower than one or more stored threshold values, for instance a first maximum speed value for the automatic movement caused by sensors 37 or 38 and a second maximum speed value for the manual movement caused by push-button 42.

Further, as the possibility of starting a movement of deflectors 1 is restrained to the speed of motor vehicle 2, so also the possibility of the same deflectors 1 of moving is restrained to the same threshold speed. If motor vehicle 2 exceeds this speed threshold with a started movement of deflectors 1, this is converted into an opening movement anyway for avoiding excessive mechanical stresses of the structures due to the aerodynamic forces acting onto deflectors 1 at high speeds. For example, a maximum speed threshold value can be equal to 180 km/h, so that over this value the motion of deflectors 1 can be inhibited or, if already started, being forced to a position, in particular the open one.

In the following table is indicated an example of threshold values which can be programmed for the position of deflectors 1.

TABLE 1

Example of threshold values

| Cooling liquid temperature [° C.] | Air temperature [° C.] | Motor vehicle speed [km/h] | Deflectors position |
|---|---|---|---|
| T < 80 | T < 30 | V < 180 | closed |
| T < 80 | 30 < T < 38 | V < 180 | closed |
| T < 80 | T > 38 | V < 180 | closed |
| 80 < T < 95 | T < 30 | V < 180 | closed |
| 80 < T < 95 | 30 < T < 38 | V < 180 | open |
| 80 < T < 95 | T > 38 | V < 180 | open |
| T > 95 | T < 30 | V < 180 | open |
| T > 95 | 30 < T < 38 | V < 180 | open |
| T > 95 | T > 38 | V < 180 | open |

The movement of the air deflectors 1 can then be continuously restrained to the satisfaction of the following four controls:

Control 1: the movement is converted into an opening if the motor vehicle 2 exceeds a predefined threshold speed. The movement possibility of deflector 1 is further restored only if the speed of motor vehicle 2 goes under the threshold minus an hysteresis value, for avoiding wobbles of the air intakes.

Control 2: if the current absorbed by a motor 19 is less than a predefined minimum current value, i.e. a mechanical or electric malfunction of the motor itself is detected, the movement is stopped and microprocessor 25 signals an anomalous working through pilot lamp 33.

Control 3: if the current absorbed by motor 19 is greater than a predefined maximum current value at an excessive distance from the required position, the presence of an obstacle is detected, otherwise the motion of deflector 1 is considered ended.

Control 4: the motion of deflector 1 is stopped when its position obtained through encoder 31 is equal to the required one.

As above explained, the position of deflectors 1 is obtained through encoders 31 counting the turns of motors 19, so as to determine the displacement of pistons 17 with respect to a zero position. The position of deflectors 1 with respect to zero is then determined and stored at every movement thereof, either this ends positively or it is interrupted by a malfunction or by the presence of an obstacle. It is therefore necessary that the movements of deflectors 1 can be determined with respect to an accurate zero position. The possibility of carrying out a reset operation, which brings deflectors 1 to the closed position until the predetermined current threshold is exceeded, is provided for this purpose. The incremental counter of encoders 31 is set to zero after this operation is carried out.

During this reset operation, the safety functions are disabled, so that, for avoiding risks, it should be requested only through a diagnostic instrument handled by authorized garages.

Changes and/or additions can be made by those skilled in the art to the above described and illustrated embodiment while remaining within the scope of the same invention.

The invention claimed is:

1. Motor vehicle having at least one air intake comprising at least one deflector (1) which is provided with one or more walls (5, 6, 9) suitable for conveying air through an opening (4) made in the body of the motor vehicle (2), wherein said deflector (1) is hinged to at least one member (7) of the motor vehicle (2) for being rotated by at least one motor (19) around an axis (3), so as to modify the size of said opening (4), characterized in that the angle comprised between the rotation axis (3) of the deflector (1) and the vertical symmetry plane of the motor vehicle (2) is not greater than 45°.

2. Motor vehicle according to claim 1, characterized in that the angle comprised between the rotation axis (3) of the deflector (1) and the vertical symmetry plane of the motor vehicle (2) is less than 5°.

3. Motor vehicle according to claim 1, characterized in that the deflector (1) comprises a side wall (5) which is convex and has a substantially rectangular shape.

4. Motor vehicle according to claim 1, characterized in that the deflector (1) comprises a rear wall (6) which is concave and has a substantially half-conical shape, with the base turned to the outside of the motor vehicle (2).

5. Motor vehicle according to claim 1, characterized in that the deflector (1) is hinged to at least one member (7) of the motor vehicle (2) by means of one or more hinges (8) turned toward the central axis of the motor vehicle itself.

6. Motor vehicle according to claim 1, characterized in that the deflector (1) comprises an inner wall (9) inclined and shaped for conveying downwards the air coming from the opening (4).

7. Motor vehicle according to claim 1, characterized in that the body of the motor vehicle (2) is shaped so as to obtain a canal (10), defined by an outer side wall (11), an inner side wall (12) and a lower wall (13), which conveys the air coming from the opening (4) toward the radiators of the motor vehicle (2).

8. Motor vehicle according to claim 7, characterized in that the air intake is arranged above the mudguard of a rear wheel of the motor vehicle (2) with the deflector (1) aligned with the body in the closed position and the canal (10) made in the same body under the deflector (1).

9. Motor vehicle according to claim 1, characterized in that the deflector (1) can be rotated by a piston (17) which can travel into a cylinder (18) and is driven by an electric motor (19), wherein the free end of the piston (17) is pivoted to a lever (20) fixed to the deflector (1), while the cylinder (18) is pivoted to a bracket (21) fixed to a member (22) of the motor vehicle (2).

10. Motor vehicle according to claim 1, characterized in that it comprises an electronic device (24) which is suitable for controlling at least one electric motor (19) for moving at least one deflector (1) and comprises electronic calculation means (25) which are powered by a power source (26) connected to the electric power lines of the motor vehicle (2) and are connected to one or more memories (27, 28, 29) containing data and programs for said electronic calculation means (25).

11. Motor vehicle according to claim 10, characterized in that said electronic calculation means (25) comprise a Motorola MC68HC908AZ60 microprocessor, and that said memories (27, 28, 29) comprise a Flash memory (27), a RAM memory (28) and an EEPROM memory (29).

12. Motor vehicle according to claim 10, characterized in that said electronic calculation means (25) are connected to at least one PWM device (30) which is connected to at least one electric motor (19) and is suitable for converting the control signals output by the electronic calculation means (25) into signals with a constant voltage and variable duty cycle.

13. Motor vehicle according to claim 10, characterized in that the position of the deflector (1) is detected by at least one encoder (31) applied to the electric motor (19) and connected to the electronic calculation means (25) through an interface (32).

14. Motor vehicle according to claim 10, characterized in that the electronic calculation means (25) are connected to a sensor (35) suitable for measuring the speed of the motor vehicle (2) for automatically determine the movement of the deflector (1) according to threshold values of the motor vehicle (2) speed stored into said memories (27, 28, 29).

15. Motor vehicle according to claim 10, characterized in that the electronic calculation means (25) are connected to a sensor (36) suitable for measuring the engine rotation speed of the motor vehicle (2) for automatically determine the movement of the deflector (1) according to rotation speed threshold values stored into said memories (27, 28, 29).

16. Motor vehicle according to any of claim 10 through 15, characterized in that the electronic calculation means (25) are connected to a sensor (37) suitable for measuring the cooling liquid temperature of the engine of the motor vehicle (2) for automatically determine the movement of the deflector (1) according to liquid temperature threshold values stored into said memories (27, 28, 29).

17. Motor vehicle according to claim 10, characterized in that the electronic calculation means (25) are connected to a sensor (38) suitable for measuring the air temperature outside the motor vehicle (2) for automatically determine the movement of the deflector (1) according to air temperature threshold values stored into said memories (27, 28, 29).

18. Motor vehicle according to claim 10, characterized in that the electronic calculation means (25) are suitable for measuring the current absorbed by the electric motor (19) and signaling anomalies, if any, of the motion of the deflector (1) through signaling means (33).

19. Motor vehicle according to claim 10, characterized in that the electronic calculation means (25) are connected to a push-button (42) arranged in the cabin of the motor vehicle (2) for manually controlling the motion of the deflector (1).

* * * * *